Sept. 11, 1956  A. P. BALDUMAN  2,762,970
DEVICE FOR DETECTING METAL
Filed Dec. 8, 1952

INVENTOR
AGAPITO P. BALDUMAN

BY
*Semmes, Keligin, Robinson & Semmes*
ATTORNEYS

United States Patent Office 2,762,970
Patented Sept. 11, 1956

2,762,970
DEVICE FOR DETECTING METAL
Agapito P. Balduman, Washington, D. C.

Application December 8, 1952, Serial No. 324,757

5 Claims. (Cl. 324—41)

This invention relates to an instrument for detecting the presence of magnetic material, and more particularly relates to an instrument which will detect and signal the presence of concealed magnetic material, such as a nail embedded in an automobile tire, when the instrument is brought into proximity to the magnetic material.

It is well known that during the travel of an automobile the tires frequently pick up nails and other metallic particles which become embedded in the outer shoe of the tire and eventually work through to the inner tube and create a puncture. Quite often these nails and other metal particles become so deeply embedded in the tires that no part of them are visible on either the outside or inside of the shoe and consequently their presence in the shoe cannot be detected by visual inspection of the tire. The result is that such embedded metal particles and nails are not extracted from the shoe and remain in the tire and eventually work through to the inner tube and puncture it.

A principal object of this invention is to provide an instrument which will detect and signal the presence of magnetic nails or other magnetic particles which have become embedded in an automobile tire so that the dangerous nail or other particle can be probed for and extracted from the tire to remove the latent danger of a puncture resulting from the nail or other metal particle continuing to be embedded in the tire.

Another object of this invention is to provide an instrument for detecting and signalling the presence of magnetic material embedded or concealed in an automobile tire, or in other material, and which instrument is handily applicable to and movable about the tire or other material to be examined thereby for the presence of concealed or embedded magnetic objects such as nails in automobile tires, said instrument detecting and signalling the presence of the nail or other magnetic substance when in proximity thereto.

Another object of this invention is to provide a self-contained instrument of the character stated and which is easily and handily movable over any surface, for instance the surface of an automobile tire, to have the instrument detect and signal the presence of a nail or other magnetic substance to which the instrument is in proximity.

A further object of this invention is to provide an instrument of the character stated and one which is simple in construction, light in weight, easy and handy to move about objects to explore for hidden nails or other magnetic material, inexpensive in parts and assembly and unitary, requiring no outside wiring or other outside connections.

Other objects of this invention will be in part obvious and in part pointed out hereinafter.

In accordance with this invention I provide a hand instrument which may be easily and handily moved about a surface under which there may be concealed magnetic material such as a nail embedded in an automobile tire, and the instrument as it is moved about emitting a visible signal whenever it has been brought into proximity with an embedded nail or other metallic particle. Thus, the presence of nails or other metal particles embedded in automobile tires may be located and then probed for and removed. Thus, the danger of punctures resulting from such nails or other metal particles remaining in the tires is eliminated.

In order that a clearer understanding of this invention may be had attention is hereby directed to the accompanying drawings illustrating certain features of this invention and in which.

Similar reference characters refer to similar parts throughout the several views of the drawings.

Figure 1:
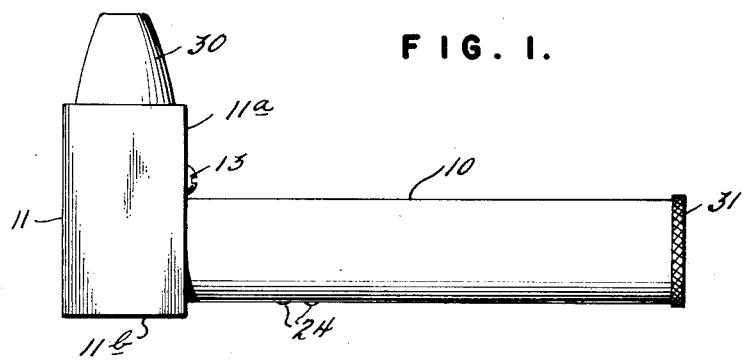
Fig. 1 is a side elevation of an instrument embodying this invention.
Figure 2:
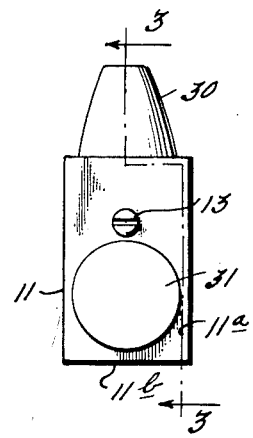
Fig. 2 is a rear view thereof.
Figure 3:
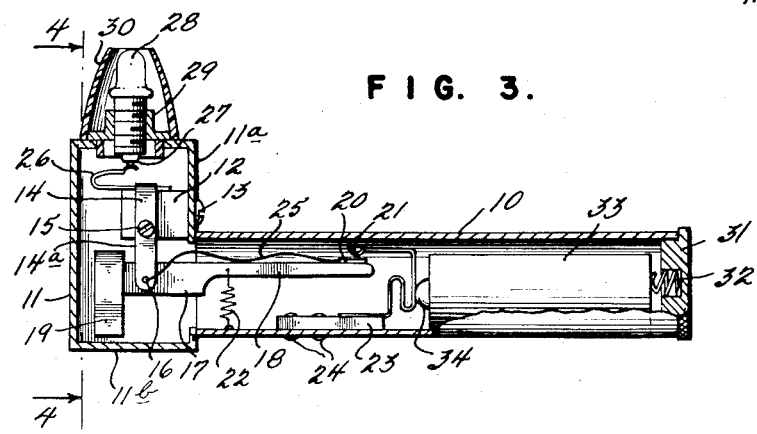
Fig. 3 is a longitudinal sectional view and is taken on the line 3—3 of Fig. 2.
Figure 4:
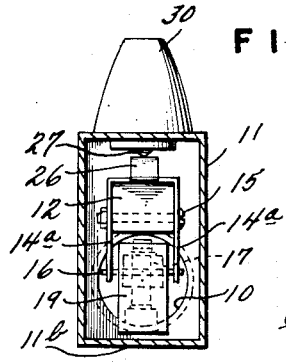
Fig. 4 is a transverse sectional view and is taken on the line 4—4 of Fig. 3.

Referring to the drawings, the instrument includes a housing made up of a tubular portion 10 to one end of which is secured as by brazing a hollow cubical housing part 11. To the rear wall 11a of housing part 11 is secured a post 12 as by means of a screw 13. A strap 14 straddles post 12 so as to present a depending arm 14a on each side of the post 12. This strap may be secured to the post 12 by means of a bolt 15. A pin 16 extends between the fingers 14a near their lower ends and on this pin 16 is pivoted an arm 17 which has a finger 18 extending rearwardly into the casing portion 10 and has a permanent magnet 19 secured to its opposite end. As clearly shown in Figure 3, pin 16 supports arm 17 closely adjacent magnet 19 so that the mass of finger 18 substantially counterbalances magnet 19 when arm 17 lies in a horizontal position.

At the rear end of finger 18, on its top, is secured an electric switch contact 20 which is adapted to move into contact with a switch finger 21 when the finger 18 is raised in consequence of the magnet 19 being attracted downwardly, switch contact 20 is normally held out of contact with the switch finger 21 by the action of a weak spring 22 fastened at its upper end to the arm 18 and its lower end to the bottom of the housing portion 10, on the inside. Spring 22 is particularly useful in assuring a normal out-of-contact position of contact 20 in all positions of the detector or where the counterbalancing effect of finger 18 is ineffective due to manufacturing defects or the position of the instrument in use. From the contact 20 a wire 25 leads to the strap 14 and a spring contact finger 26 is connected at one end to the strap 14 and has its upper end engaging the center contact 27 of a small electric lamp 28 which is screwed into a socket 29 mounted on top of the housing portion 11. This lamp is preferably surrounded by a transparent or translucent guard 30 which is also secured to the top of the housing portion 11.

The rear of housing portion 10 is provided with a cap 31 carrying a spring 32 and a flash light battery 33 is adapted to be placed within the housing portion 10 so that its front contact 34 will engage the switch finger 21 and the spring 32 of the cap 31 will engage the bottom of the battery 33 and maintain the battery in place. Spring 32 also completes the circuit from the battery to the lamp through the housing.

In operation the instrument is grasped in the hand and for this the housing portion 10 makes a very convenient and comfortable handle. The bottom wall 11b of housing portion 11 is then moved slowly over and about the surface of the article such as an automobile tire, which is being examined for the presence of concealed nails or other magnetic particles. Whenever the housing portion 11 comes into proximity with such a nail or other magnetic particle the magnet 19 will be attracted downwardly and the contact 20 will contact the switch arm 21 causing the light 28 to light, thus indicating the presence of the nail or other magnetic particle. The operator may then probe for such a particle and remove it from the tire to eliminate likelihood of the tire being punctured thereby.

From the above it is apparent that the instrument is very simple and inexpensive in construction, is light in weight and very easy to handle, and at the same time is reliable in operation and gives a very clear and prominent signal to announce the detection of an embedded nail or other magnetic particle. It is also to be understood that the battery 33 can be replaced readily and easily.

As many changes can be made in the above construction and as many different embodiments can be made without departing from the scope of this invention, it is understood that all matter contained in the above description or shown in the accompanying drawings be interpreted as illustrative and not in a limiting sense.

What I claim is:

1. A portable signalling type metal detector for use in locating metal particles embedded in vehicle tires or the like comprising an elongated hollow metal handle portion; a hollow non-magnetic metal housing at one end of said handle opening into said handle and forming a walled compartment at said one handle end; an electrical socket mounted in and electrically connected to one wall of said compartment; an electrical indicator supported by said socket and having a first contact extending into said compartment and electrically insulated therefrom and a second contact electrically connected to said handle through said socket and the walls of said compartment; a stationary electrical switch contact supported by and insulated from said handle; a battery in said handle electrically connecting said stationary switch contact and said handle; a rigid arm extending from said compartment along said handle and carrying a movable switch contact at its end in juxtaposition to said stationary switch contact and circuit means connecting said movable contact and said first indicator contact; a pivot for said arm extending transversely of said arm; spring means connected at one end to said handle and at its other end to said one end of said arm and operative to normally bias said arm in a direction to maintain said movable switch contact and said stationary switch contact in spaced relation in all positions of said detector; and a permanent magnet mounted on the other end of said arm with its magnetic field normal to the axis of said arm and at right angles to said arm pivot and adapted when brought into magnetizing relation to hidden magnetic material to move in a direction to overcome said spring, tilt said arm and close said switch contacts whereby said indicator will be energized to signal the presence of said magnetic material.

2. A self contained signalling type metal detector according to claim 1 wherein the pivot for said pivoted arm is located near said other end of said arm so that said one end of said arm substantially counterbalances said magnet and said spring means is connected to said arm at a point a substantially greater distance from said pivot than said magnet whereby a relatively weak spring readily overcome by the magnetic forces acting on said magnet may be effectively used thereby assuring a substantially constant biasing force irrespective of the operating position of the detector.

3. A portable signalling type metal detector for use in locating metal particles embedded in vehicle tires or the like comprising an elongated hollow metal handle portion; a hollow non-magnetic metal housing at one end of said handle opening into said handle and forming a walled compartment at said one handle end; an electrical socket mounted in and electrically connected to one wall of said compartment; an electrical indicator supported by said socket and having a first contact extending into said compartment and electrically insulated therefrom and a second contact electrically connected to said handle through said socket and the walls of said compartment; a stationary electrical contact supported by and insulated from said handle; a battery in said handle disposed with its anode in contact with said said stationary contact and its cathode in contact with said handle to electrically connect said stationary contact and said handle; a magnet assembly mounted in said housing and comprising a pivoted bell-crank lever providing a permanent magnet in said housing having one arm extending toward said handle and normal to the magnetic field of said permanet magnet; a movable switch contact on said bell-crank lever; circuit means comprising said movable contact and said indicator contacts for connecting said movable contact to the cathode of said battery; a pivot for said bell-crank lever extending transversely of said arm whereby when the detector is brought into magnetizing relation to hidden magnetic material the bell-crank lever tilts to move said movable contact in a direction to complete the circuit from said battery anode to said circuit means thereby energizing said indicator to signal the presence of said magnetic material.

4. A portable signalling type metal detector for use in locating metal particles embedded in vehicle tires or the like comprising a hollow, elongated handle; a transversely disposed housing portion at one end of said hollow handle; removable cap means for closing the other end of said handle; a battery disposed in said handle at said other end and having an anode, and a cathode engaged by said removable cap means; a bulb socket disposed in said transversely disposed housing adjacent one end of said housing with its socket opening facing said one end and having a center contact and a wall contact; a bulb mounted in said socket and electrically connecting said socket contacts; a cap closing said one end of said transversely disposed housing and having a centered opening enclosing the tip of said bulb; circuit means connecting said socket contacts respectively to said battery anode and said battery cathode through a make and break switch comprising a stationary contact; a movable arm pivotally supported between its ends adjacent the juncture of said hollow handle and said transverse housing with one end disposed in said transverse housing and the other end extending along said handle toward said stationary contact and comprising a movable switch arm; means normally biasing said switch arm to circuit breaking position; and a magnet mounted on said one end of said arm and adapted when said other end of said transverse housing is passed over the surface of a tire or the like to be attracted toward said other end of said housing when said other housing end passes over embedded magnetic metal particles in said tire or the like thereby moving said arm from its normal circuit breaking position to a position engaging said stationary contact of said make and break switch and completing a circuit to energize said bulb and provide a visible signal indicating the presence of metal particles below said other end of said transverse housing.

5. A self contained signalling type metal detector according to claim 4 wherein said magnet is substantially right angularly disposed on said one end of said arm to depend from said one end and the pivot for said bell-crank lever is located near said magnet on said one end so said other end of said arm substantially counterbalances said depending magnet and there is a spring means indirectly connected at one end to said handle and connected at its other end to said other end of said arm at a point a substantially greater distance from said pivot than said magnet whereby a relatively weak spring readily overcome by the magnetic forces acting on said magnet may be effectively used to maintain said movable switch arm in open circuit position in all positions of said detector thereby assuring a substantially constant biasing force irrespective of the operating position of the detector.

References Cited in the file of this patent

UNITED STATES PATENTS

| Number | Name | Date |
|---|---|---|
| 777,750 | Sargent | Dec. 20, 1904 |
| 1,778,655 | Wyman | Oct. 14, 1930 |
| 2,318,666 | Bruce | May 11, 1943 |
| 2,579,404 | Stevenson | Dec. 18, 1951 |
| 2,600,857 | De La Mater | June 17, 1952 |
| 2,637,115 | Watson | May 5, 1953 |